July 24, 1962 R. E. SUMMERS 3,046,052
REVOLVABLE SEAT
Filed July 13, 1959 2 Sheets-Sheet 1
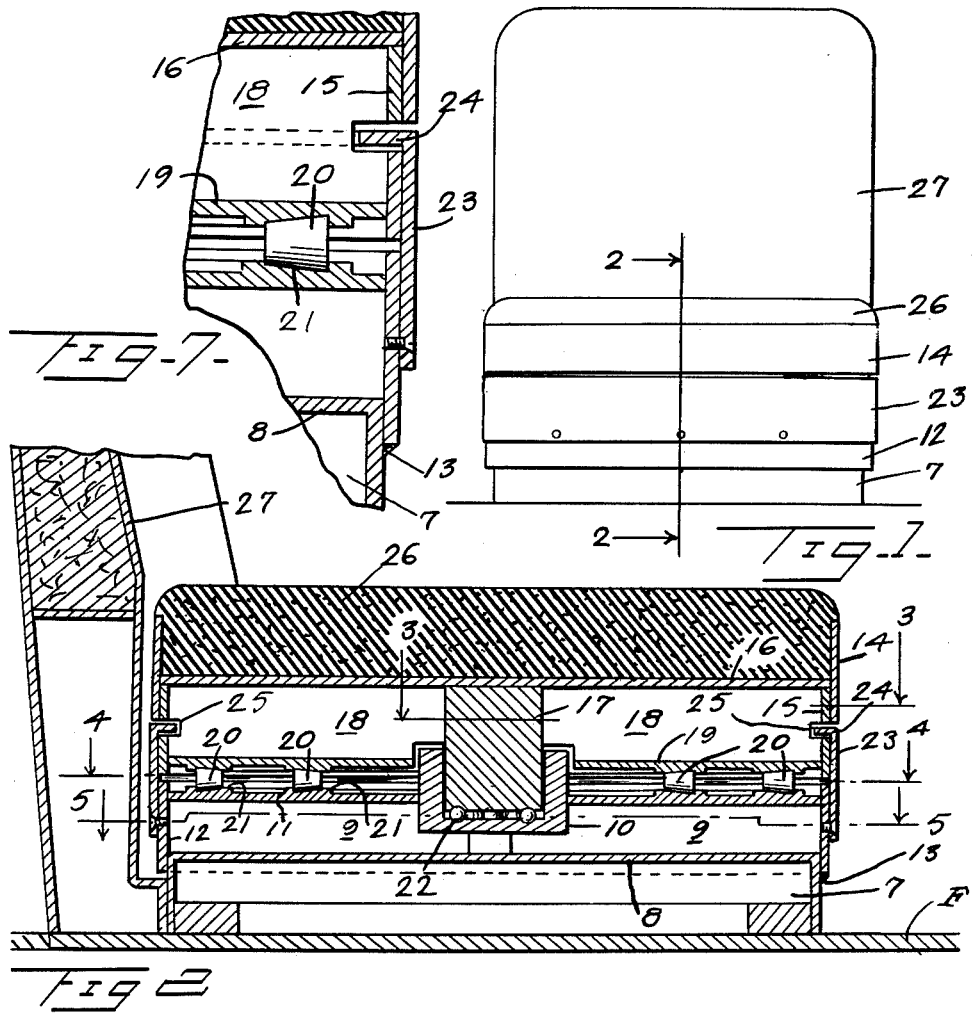
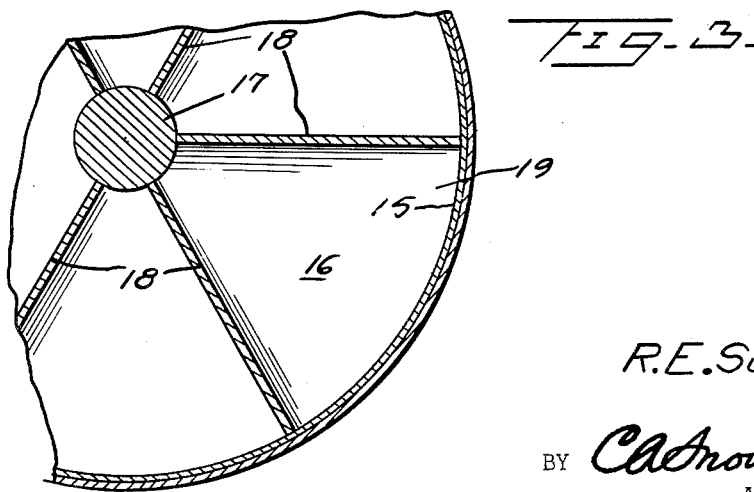
R. E. SUMMERS
INVENTOR
BY *CA Snowles*
ATTORNEYS.

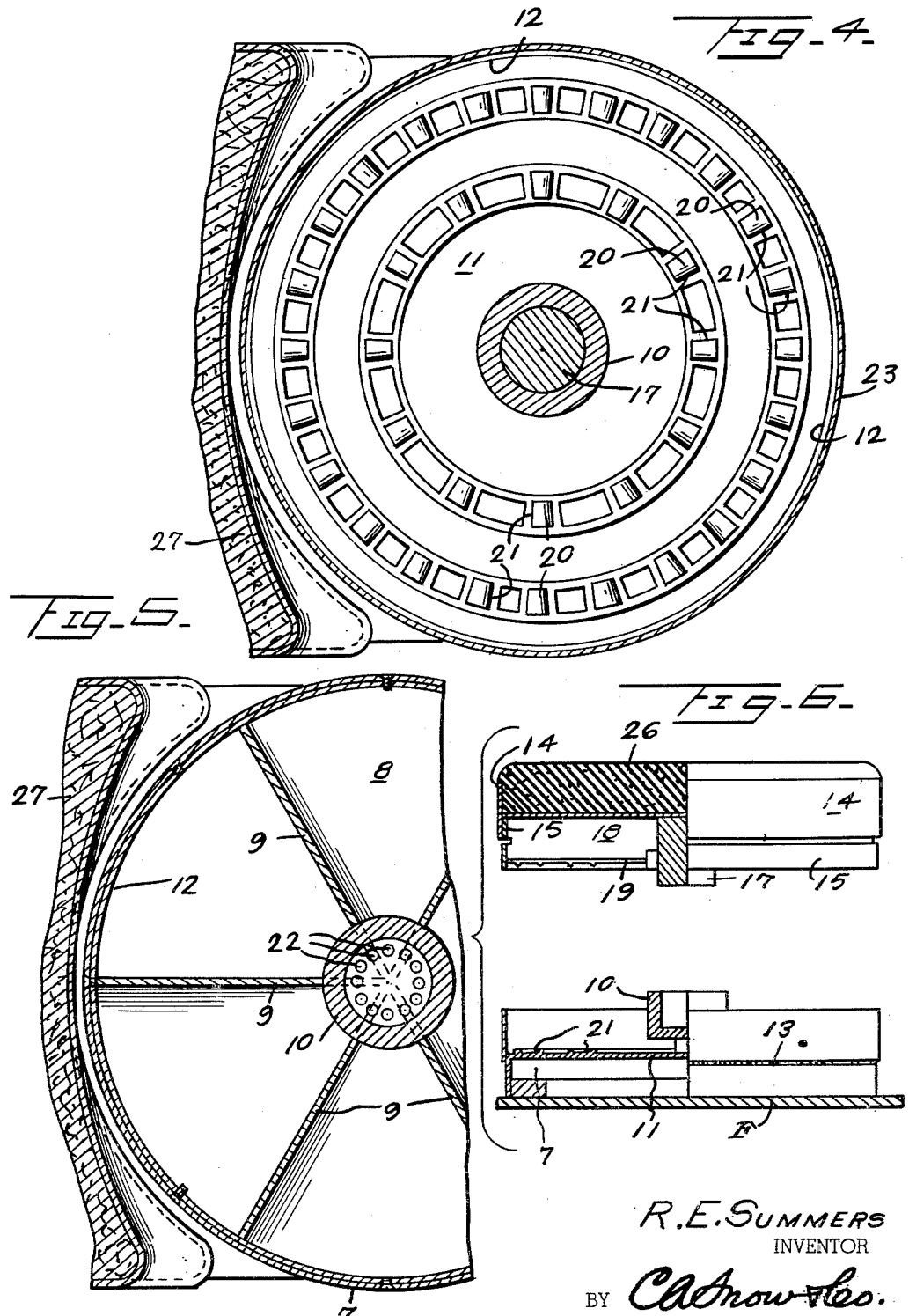

3,046,052
REVOLVABLE SEAT
Reuben E. Summers, San Diego, Calif.
Filed July 13, 1959, Ser. No. 826,619
2 Claims. (Cl. 297—337)

This invention relates to seats, and more particularly to revolvable front seats for use in vehicles and the like.

It is well known to those experienced in the vehicle art that considerable difficulty is experienced by persons entering or leaving a vehicle because of the tendency of the person's clothes to stick to the seat and thus prevent the sliding movement necessary for getting in or out of the seat, particularly the operator's seat, as the steering wheel is in the way.

It is therefore an object of this invention to provide a revolvable seat that can be rotated towards the door for ease of a person entering or leaving a vehicle.

Another object of this invention is to provide a revolvable seat that can be readily installed in any vehicle in place of the regular seat provided as standard equipment in the vehicle.

Still another object of this invention is to provide a revolvable seat that can be used wherever a seat of this type is required and space is limited, for example, in aeroplanes, boats, or in a room having a limited space for entering and leaving a seat.

Other and further objects and advantages of this invention will be hereinafter described and the novel features thereof defined in the appended claims.

Referring to the drawing:

FIGURE 1 is a front view of this invention.

FIGURE 2 is a sectional view taken substantially along line 2—2 of FIG. 1 as viewed in the direction indicated by the arrows.

FIG. 3 is a sectional view taken substantially along line 3—3 of FIG. 2 as viewed in the direction indicated by the arrows.

FIG. 4 is a sectional view taken substantially along line 4—4 of FIG. 2 as viewed in the direction indicated by the arrows.

FIG. 5 is a sectional view taken substantially along line 5—5 of FIG. 2 as viewed in the direction indicated by the arrows.

FIG. 6 is a front view of this invention, partially broken away, and showing its two halves ready for assembly.

FIG. 7 is an enlarged fragmentary view of this invention showing the final assembly of the seat.

Similar reference characters refer to similar parts throughout the several views of the drawings.

Having reference now to the drawings in detail, and in particular to FIG. 2, there is generally indicated by the reference character 7 a circular supporting member having a top 8 on which is secured a plurality of radially spaced plates 9 converging on a tubular support 10. These plates are stood on their long edge on the stated top 8. A bearing plate 11 having an opening for the protrusion of tubular support 10 is now placed on top of the radial plates 9 and a retaining member 12 is wrapped around the entire described assembly, to which it is seam welded at 13 to the circular supporting member 7, which of course forms a part of this stated assembly, and which is rigidly secured to a floor member F of the vehicle.

The revolvable part of this seat comprises a large circular member 14 that is the same diameter as that of the seat, and a second circular member 15 fitting snugly inside the stated large circular member. A seat cushion supporting plate 16 having a center post 17 secured to its under side is placed within the circular member 14, and on top of the second member 15, as is clearly shown in FIG. 2 of the appended drawings.

A plurality of radially spaced seat plates 18 are now secured by their long edge to the under side of the cushion supporting plate. These plates are radially spaced within the second circular member 15, as shown in FIG. 3 of the drawings. A top bearing plate 19 is secured to the bottom edge of the radially spaced seat plates as well as to the center post 17.

The fixed and supporting structure of this seat is clearly designated by the reference characters 7 to and including 13, and is best shown as a unit in FIG. 6, while the revolvable portion of the seat minus its cushion is described by reference characters 14 to and including 19, and is also well shown in FIG. 6 of the appended drawings.

Before the described fixed and revolvable portions of this seat are assembled, it will be necessary to place a number of rollers 20 within recess 21 of bearing plate 11, as well as to place a number of steel balls 22 in the bottom of tubular support 10, as the entire weight of the revolvable seat and its occupant will rest upon the stated rollers 20 and balls 22, which affects both the roller and ball bearing surface for the revolving of the seat as a person enters or leaves the vehicle. A locking ring 23 is removably secured to the retaining member 12 as best illustrated by the enlarged sectional portion given in the drawings as FIG. 7.

It will be noted from FIG. 7, as well as from sectional FIG. 2, that the actual locking of the revolvable and fixed sections of the seat together in the vertical plane is accomplished by means of a flange 24 formed from the upper edge of the locking ring 23 projecting into a U-shaped opening 25 in the outer edge of each of the radially spaced seat plates 18. A cushion 26 of any suitable material is now placed on top of cushion supporting plate 16. The seat itself has now been completely assembled.

The back of the seat noted by the reference character 27 in FIGS. 1, 2, 4 and 5 may be of any desired construction, and forms no part of this invention.

From the foregoing it will now be seen that there is herein provided a revolvable seat which accomplishes all of the objects of this invention, and others, including many advantages of great practical utility and commercial importance.

As many embodiments may be made of this inventive concept, and as many modifications may be made in the embodiment hereinbefore shown and described, it will be understood that all matter herein is to be interpreted merely as illustrative and not in a limiting sense.

I claim:

1. A revolvable automobile seat, comprising a circular base, a wide circular stationary retaining member rising from said base, a plurality of spaced vertical plates radiating from the axis of said circular retaining member, secured thereto, a stationary circular horizontal bearing plate having spaced roller bearing recesses in the upper surface thereof, secured within said wide circular retaining member, a stationary tubular support having an open upper end, secured axially of said supporting plate, a top horizontal rotatable bearing plate disposed above said stationary supporting plate, said top horizontal rotatable bearing plate having roller bearing recesses confronting said roller bearing recesses in said circular horizontal supporting plate, roller bearings disposed within said confronting roller recesses, a plurality of vertical seat plates having U-shaped openings in their outer ends, resting on said top horizontal rotatable bearing plate, a locking ring secured to said circular retaining member, an annular flange extending inwardly from the upper edge of said locking ring, disposed within said U-shaped openings of said vertical seat plates, rotatably securing said seat plates to said base, a horizontal cushion supporting plate mounted on said vertical seat plates, a center post depending from the axis of said cushion supporting plate, disposed within said tubular support, ball bearings within said tubular support on which said center post rests, and a cushion mounted on said seat supporting plate.

2. The subject matter as claimed in claim 1, and a wide circular member fitted over the edge of said cushion supporting plate extending above said cushion supporting plate in which said cushion is held.

References Cited in the file of this patent

UNITED STATES PATENTS

| | | |
|---|---|---|
| Re. 17,680 | Smelker | May 27, 1930 |
| 691,062 | Kunst | Jan. 14, 1902 |
| 992,917 | Simpson | May 23, 1911 |
| 1,029,821 | Patterson | June 18, 1912 |
| 1,337,059 | Fisher | Apr. 13, 1920 |
| 2,744,565 | Zwick | May 8, 1956 |
| 2,876,051 | Fox | Mar. 3, 1959 |

FOREIGN PATENTS

| | | |
|---|---|---|
| 757,269 | France | Oct. 9, 1933 |